United States Patent
Kawashima et al.

(10) Patent No.: US 6,333,768 B1
(45) Date of Patent: Dec. 25, 2001

(54) CONVERGENCE CALIBRATION IN VIDEO DISPLAYS WITH SIGNAL LEVEL CONTROL

(75) Inventors: Toshiyuki Kawashima, N. Hundingdon, PA (US); Toshiyuki Saigo, Kawasaki (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/028,838

(22) Filed: Feb. 24, 1998

(51) Int. Cl.[7] .............................. H04N 17/00; H04N 3/26; H04N 3/23; H04N 9/28; G09G 1/28; H01J 29/51
(52) U.S. Cl. .......................... 348/806; 348/806; 348/807; 348/180; 348/181; 348/745; 348/746; 315/368.11; 315/386.18; 315/386.24
(58) Field of Search .................................. 348/745, 746, 348/747, 807, 806, 190, 181, 180, 189; 315/368.11, 368.18, 368.21, 368.24

(56) References Cited

U.S. PATENT DOCUMENTS

| | | | |
|---|---|---|---|
| 4,857,998 | * | 8/1989 | Tsujihara et al. ...................... 358/60 |
| 4,999,703 | * | 3/1991 | Henderson .............................. 358/64 |
| 5,231,481 | * | 7/1993 | Eouzan et al. .......................... 358/60 |
| 5,532,765 | * | 7/1996 | Inoue et al. ............................ 348/807 |
| 5,550,598 | * | 8/1996 | Itoh et al. .............................. 348/807 |
| 5,559,565 | * | 9/1996 | Yun ....................................... 348/806 |
| 5,576,774 | * | 11/1996 | Hosoi et al. .......................... 348/745 |
| 5,793,340 | * | 8/1998 | Morita et al. ............................. 345/7 |
| 5,872,593 | * | 2/1999 | Kawashima et al. ................. 348/181 |
| 5,883,476 | * | 3/1999 | Nogouchi et al. .............. 315/368.11 |
| 5,898,465 | * | 4/1999 | Kawashima et al. ................. 348/745 |
| 5,923,366 | * | 7/1999 | Kawashima et al. ................. 348/190 |
| 6,057,881 | * | 5/2000 | Kawashima et al. ................. 348/190 |

* cited by examiner

*Primary Examiner*—Reinhard J. Eisenzopf
*Assistant Examiner*—Paulos Natnael
(74) *Attorney, Agent, or Firm*—Frommer Lawrence & Haug LLP; William S. Frommer; Dexter T. Chang

(57) ABSTRACT

A television system performs beam convergence in video displays. The system is implemented through one or more convergence sensors, which are exposed to two distinct convergence test patterns. The output signals from the sensors when exposed to the two convergence test patterns are used in beam convergence calculations. The convergence test patterns are selected to reduce the dynamic range requirement for an A/D converter in the television system supplied with the sensor output signals.

9 Claims, 14 Drawing Sheets

NO PATTERN

NO PATTERN

DECAY CHARACTERISTIC OF EACH PHOSPHOR

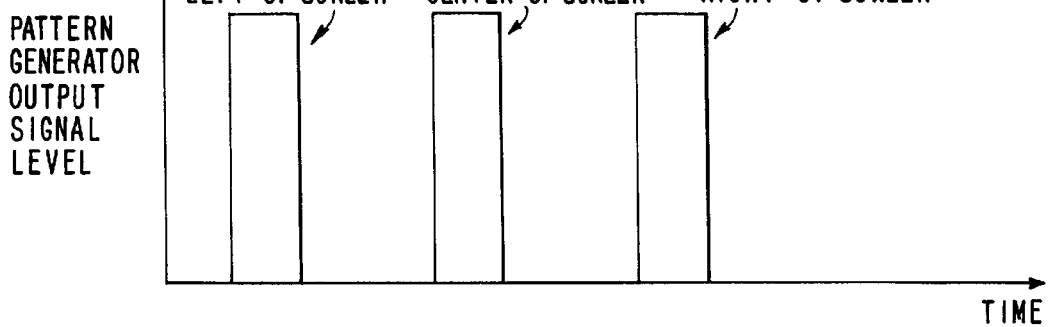
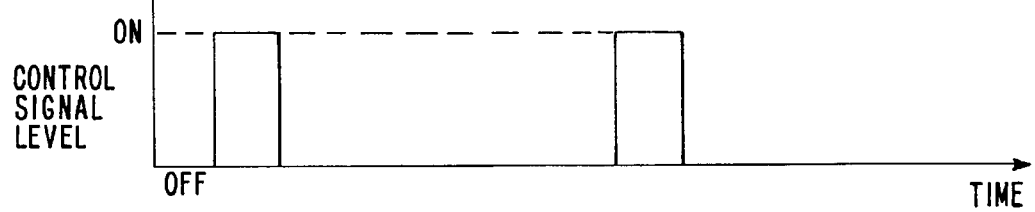
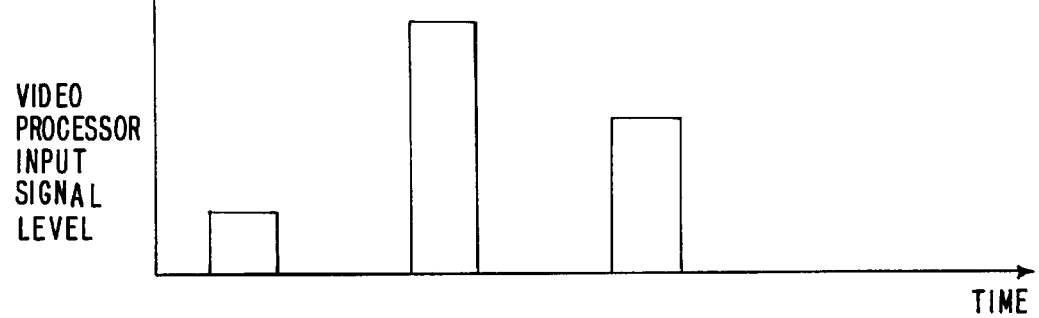
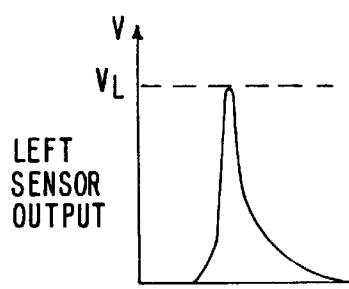
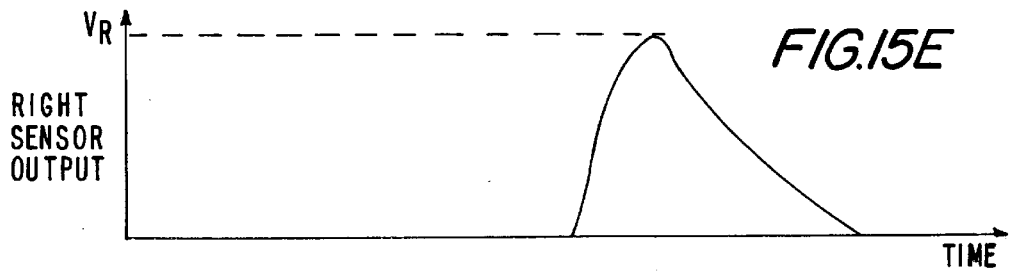

CONVERGENCE CALIBRATION IN VIDEO DISPLAYS WITH SIGNAL LEVEL CONTROL

BACKGROUND OF THE INVENTION

The present invention is related to video displays, and more particularly to performing convergence calibration in a video display with signal level control.

It is well known in the field of video displays to generate pictures on a screen by combining multiple beams of light. For example, a typical rear projection color television set includes three cathode ray tubes (CRTs), each CRT processing one of the primary colors—red, blue or green. By combining the three monochromatic beams the set can produce full color television pictures. However, in order for the set to produce accurate pictures, proper alignment of the beams must be maintained. That is, the CRTs must be calibrated so that their beams are focused at the same point on the screen. Accordingly, the calibration of the CRTs is often referred to as a convergence procedure, and beam alignment is often referred to as convergence. For a more detailed discussion of convergence, references are made to FIGS. 1 and 2.

FIG. 1 is a plan view of a model rear projection television set. The components of the set are housed within a cabinet 10, and they include: a CRT 12, a lens 14, a mirror 16, and a screen 18. The model set includes three CRTs and multiple lenses for each CRT, although for clarity, only a single CRT and a single lens are shown in the figure. The light from the CRT passes through the lens and illuminates the mirror which, in turn, reflects the light onto the screen for observation by the viewer.

FIG. 2 illustrates the relationship between the three CRTs of the model set. As can be seen from the figure, CRTs 12, 20 and 22 are matched respectively with lenses 14, 24 and 26, and the CRTs are aligned so that their beams converge. To maintain the alignment of the beams one or more photosensors are typically provided at the periphery of the screen. An example is shown in FIG. 3.

FIG. 3 includes an arrangement of four photosensors, 28, 30, 32 and 34. The sensors are located inside the cabinet and are not visible to the viewer. Also, the sensors are located behind a screen frame 36, which is not part of the display screen, and therefore the sensors do not interfere with images displayed on the screen. Nevertheless, the sensors are located within the area that can be scanned by the CRTs.

FIG. 4A shows the relationship between sensors 28–34, screen 18, and a CRT scannable area 38 as seen from the viewer's perspective. For clarity the screen frame is not shown. When performing the convergence procedure, test patterns are produced within the scannable area and detected by the sensors. More specifically, each CRT produces two test patterns, a wide pattern and a narrow pattern. Thus, to complete the convergence procedure the following patterns are produced: red-wide, red-narrow, blue-wide, blue-narrow, green-wide, and green-narrow. These patterns and their function are discussed in more detail in connection with FIGS. 4B–4E.

FIGS. 4B–4E show illustrative test patterns as generated by any one of the primary color CRTs. In the interest of brevity, FIGS. 4B–4E are discussed in the context of the red CRT only. However, it should be noted that the discussion is equally applicable to the other primary color CRTs.

FIGS. 4B and 4C show test patterns that are generated when the red CRT is properly aligned with the center of the screen. FIG. 4B shows a red-wide pattern 40 and its relative position to the scannable area, screen, and sensors. As can be seen from the figure, the red-wide pattern is made up of four illuminated areas that define a rectangle (indicated by the dotted line). Each illuminated area overlaps the entirety of one sensor. The center point of the scannable area is denoted by "o" and the center of the rectangle defined by the red-wide pattern is denoted by "x". Since the red CRT is properly aligned, the o and x coincide.

FIG. 4C shows a red-narrow pattern 42. As in the case of the wide pattern, since the CRT is properly aligned, the x and o coincide. However, in the case of the narrow pattern, only one half of each of the sensors is overlapped by the pattern. The relative sensor overlap in the wide pattern and narrow pattern cases is key to maintaining alignment of the CRT, and will be discussed in more detail below. First, FIGS. 4D and 4E are referred to in order to show the effect of misalignment on the test patterns.

FIG. 4D shows a red-wide pattern 44 that is generated when the red CRT is misaligned by an amount $\delta$ in the horizontal direction (left of center from the viewer's perspective). Since the pattern is sufficiently wide, it still overlaps the entirety of each of the sensors. FIG. 4E shows red-narrow pattern 46 that is generated when the red CRT is misaligned by an amount $\delta$ in the horizontal direction (left of center from the viewer's perspective). In FIG. 4E, since the pattern is narrow, the sensor overlap is changed relative to the overlap shown in FIG. 4C. As will be described below, this change in overlap is used to determine the amount of misalignment, which is, in turn, used as an error signal for the purpose of correcting the misalignment.

The amount of beam misalignment at a position defined by a given sensor is determined by observing that sensor's readings when exposed to the wide and narrow patterns. The observed readings are used to form a ratio which is then compared to a desired ratio, the desired ratio being the ratio obtained for the sensor under no misalignment conditions. The difference between the measured ratio and the desired ratio indicates the amount of beam misalignment. Described below is an illustrative misalignment determination as performed by sensor 28.

FIGS. 5A–5E show the relationship between sensor 28 and various test patterns. FIG. 5A depicts the sensor in a no pattern condition. FIGS. 5B–5E show the sensor as illuminated by the patterns of FIGS. 4B–4E, respectively. To measure the misalignment, the light incident on sensor 28 is measured for each of the wide and narrow cases and a ratio of the two is computed. The value of the ratio in the no misalignment case is the desired ratio, and it is obtained in the following manner: the sensor reading under no pattern conditions (noise) is subtracted from the sensor reading under wide-pattern/no-misalignment conditions (FIG. 5B) to generate a first difference; the sensor reading under no pattern conditions is subtracted from the sensor reading under narrow-pattern/no-misalignment conditions (FIG. 5C) to generate a second difference; and the second difference is divided by the first difference. To obtain the value of the ratio for the depicted misalignment: the sensor reading under no pattern conditions (noise) is subtracted from the sensor reading under wide-pattern/$\delta$-misalignment conditions (FIG. 5D) to generate a first difference; the sensor reading under no pattern conditions is subtracted from the sensor reading under narrow-pattern/$\delta$-misalignment conditions (FIG. 5E) to generate a second difference; and the second difference is divided by the first difference. The difference between the two ratios thus obtained indicates the amount of misalignment. The red CRT is then adjusted until the ratios match. A similar procedure is executed for the other primary beams and in this way convergence is achieved.

OBJECTS OF THE INVENTION

It is an object of the present invention to calibrate video displays accurately and easily.

It is another object of the present invention to adjust video displays having input signal level control.

It is a further object of the present invention to provide convergence calibration/adjustment with optimum utilization of the dynamic range in A/D converters in video displays.

It is a yet further object of the present invention to provide convergence calibration/adjustment without supplying either a saturation signal level or insufficient signal level to A/D converters in video displays such that the accuracy of calibration/adjustment is enhanced.

SUMMARY OF THE INVENTION

These and other objects, features and advantages are accomplished by apparatus for performing a convergence calibration operation using a number of beams. The inventive apparatus includes a signal generator for generating first and second video signals for use in the convergence calibration operation. Further included is a level controller for controlling respective levels of the generated first and second video signals received from the signal generator. The apparatus also comprises a beam generator for generating first and second beam patterns in response to the first and second video signals, respectively, supplied by the level controller. Also included in the apparatus is at least one sensor for converting the generated first and second beam patterns to first and second output signals, respectively, in response to the generated first and second beam patterns, respectively. Further, the inventive apparatus comprises a programmable controller for receiving the first and second output signals and for determining alignment of the beams based on the received first and second output signals.

In accordance with one aspect of the present invention, the signal generator selectively generates a control signal such that the level controller controls respective levels of the generated first and second video signals in response to the control signal received from the signal generator. The control signal is active only during the convergence calibration operation.

In accordance with another aspect of the present invention, the level controller comprises a number of switches and resistors for selectively attenuating respective levels of the generated first and second video signals.

BRIEF DESCRIPTION OF THE DRAWINGS

The above-mentioned as well as additional objects, features and advantages of the present invention will become readily apparent from the following detailed description thereof which is to be read in conjunction with the accompanying drawings, in which:

FIGS. 15A–E are graphs of various input and output signals provided by the pattern generator 101, level controller 106, video processor 100 and sensors 64, 66, 68, 70 in accordance with the present invention.

In all Figures, like reference numerals represent the same or identical components of the present invention.

DETAILED DESCRIPTION OF THE PREFERRED EMBODIMENTS

FIGS. 6A–6D show illustrative beam convergence test patterns generated according to a preferred embodiment of the invention. Although the test patterns depicted in the figures may be generated by any one of the CRTs, they will be discussed in the context of the red CRT for clarity of presentation.

Figure 6A:
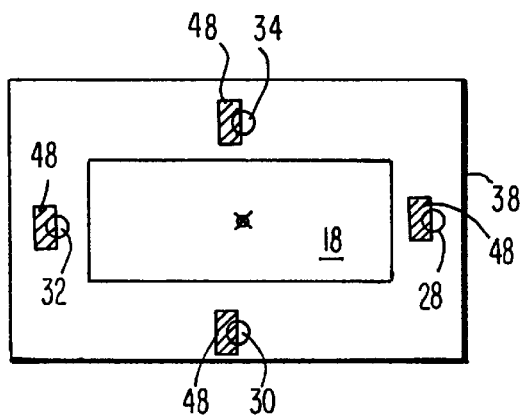
FIGS. 6A–6D show the relationship between the sensors, the display screen, the scannable area, and several test patterns in accordance with the present invention.
Figure 6B:
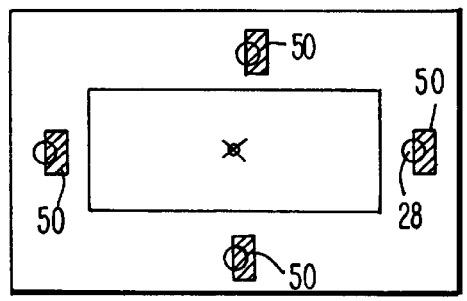

FIGS. 6A and 6B show the test patterns generated by the red CRT when it is properly aligned. FIG. 6A shows a first test pattern 48 which overlaps a left side portion (from the viewer's perspective) of each sensor. FIG. 6B shows a second test pattern 50 which overlaps a right side portion of each sensor. As was the case in FIGS. 4A–4E, "o" indicates the center of the screen and "x" indicates the center of the rectangle defined by the test patterns. The "o" and "x" coincide in FIGS. 6A and 6B since these figures represent the case of proper beam alignment.

Figure 6C:
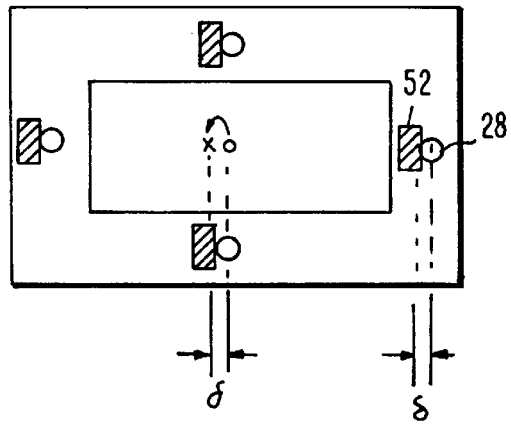
Figure 6D:
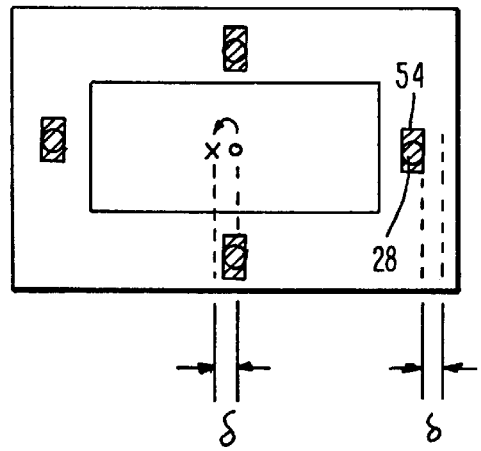

FIGS. 6C and 6D show a shifted first test pattern 52 and a shifted second test pattern 54, respectively. The shifted first pattern is the pattern that results when the CRT is misaligned and attempts to generate the first pattern. The shifted second pattern is the pattern that results when the CRT is misaligned and attempts to generate the second pattern. In both of FIGS. 6C and 6D, the CRT is misaligned by an amount δ in the horizontal direction (left of center from the viewer's perspective).

As can be seen from FIGS. 6A–6D, the effect of the misalignment on the first pattern is to shift the pattern (FIG. 6C) so that its overlap with sensor 28 significantly less than it was in the no-misalignment case (FIG. 6A). Whereas the effect of the misalignment on the second pattern is to shift the pattern (FIG. 6D) so that its overlap with sensor 28 is significantly greater than it was in the no-misalignment case (FIG. 6B). As will be described below, the overlap changes for the two test patterns that occur as a result of misalignment are used to determine the amount of misalignment. The amount of misalignment is then, in turn, used as an error signal for the purpose of correcting the misalignment.

The amount of misalignment is determined by observing the sensor readings as the sensor is exposed to the first and second patterns. The readings obtained are used to form a measured ratio that is compared to a desired ratio, the desired ratio being the ratio obtained for the sensor under no-misalignment conditions. The difference between the measured ratio and the desired ratio indicates the amount of beam misalignment at the sensor's location. What follows is a description of an illustrative misalignment determination as performed on the basis of readings taken through sensor 28.

Figure 7A:
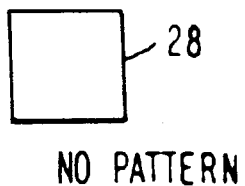
FIG. 7A is a representation of an unilluminated sensor.

FIGS. 7A–7E show the relationship between sensor 28 and various test patterns. FIG. 7A depicts the sensor in a no pattern condition. FIGS. 7B–7E show the sensor as illuminated by the patterns of FIGS. 6A–6D, respectively. To measure the misalignment, the light incident on sensor 28 is measured for each of the first pattern and second pattern measurements to form a ratio. The value of the ratio in the no-misalignment case is the desired ratio, and it is a design parameter for the television set. To obtain the value of the desired ratio: the sensor reading under no pattern conditions (noise) is subtracted from the sensor reading under first-pattern/no-misalignment conditions (FIG. 7B) to generate a first difference; the sensor reading under no pattern conditions is subtracted from the sensor reading under second-pattern/no-misalignment conditions (FIG. 7C) to generate a second difference; the first difference is added to the second difference to form a sum; and the first difference is divided by the sum. To obtain the value of the ratio for the depicted misalignment: the sensor reading under no pattern conditions (noise) is subtracted from the sensor reading under first-pattern/δ-misalignment conditions (FIG. 7D) to generate a first difference; the sensor reading under no pattern conditions is subtracted from the sensor reading under second-pattern/δ-misalignment conditions (FIG. 7E) to generate a second difference; the first difference is added to the second difference to form a sum; and the first difference is divided by the sum. The difference between the two ratios thus obtained indicates the amount of misalignment. The red CRT is then adjusted until the ratios match. A similar procedure is executed for the other primary beams and in this manner convergence about sensor 28 is achieved. Finally, similar procedures may then be executed about the other sensors to complete an overall convergence procedure.

By using the test patterns of the present invention the dynamic range required of the sensor A/D converters is reduced, thereby allowing convergence procedures to be performed through more cost efficient hardware. To illustrate how the dynamic range requirement is reduced reference is made to FIGS. 5A–5E and 7A–7E.

Figure 1:
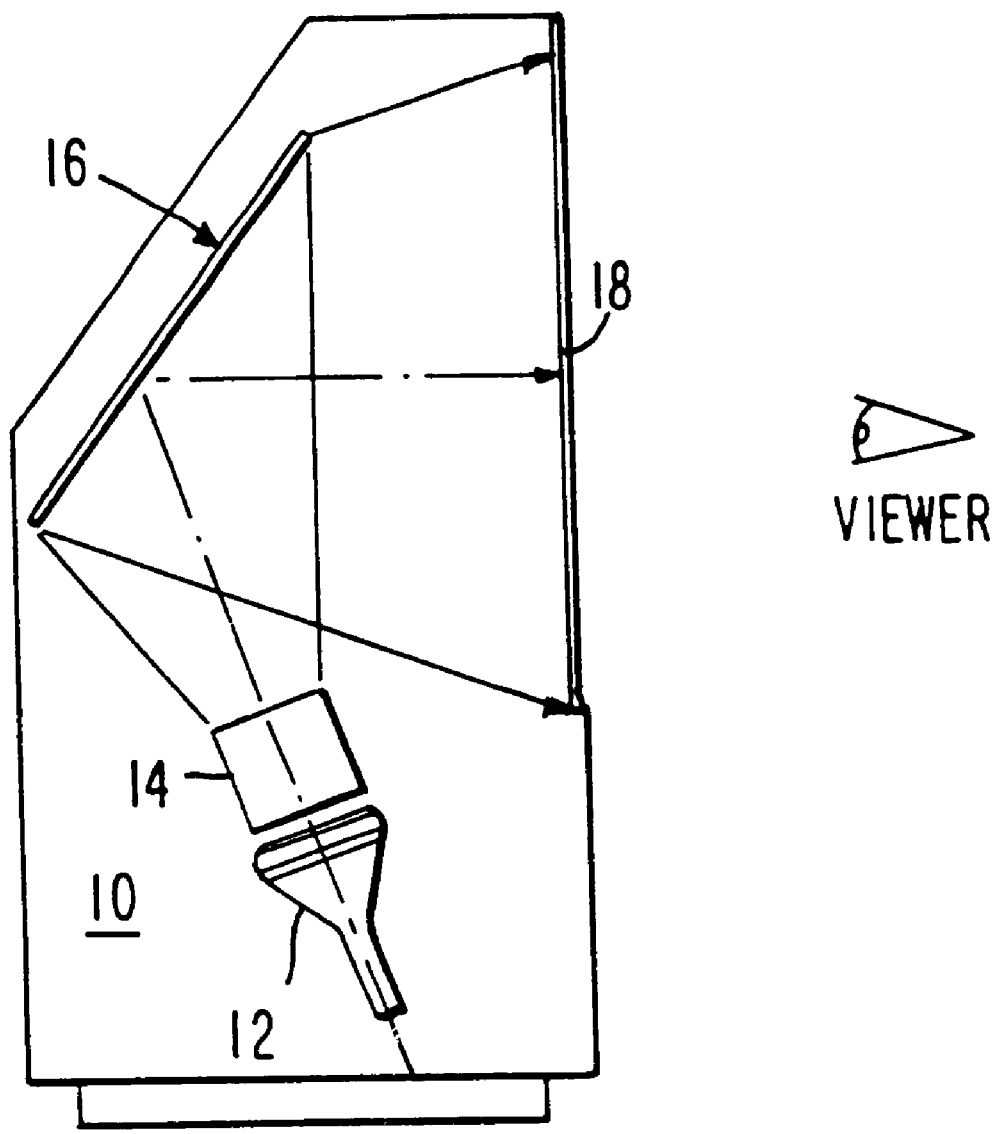
FIG. 1 is a plan view of a typical rear projection television set.
Figure 2:
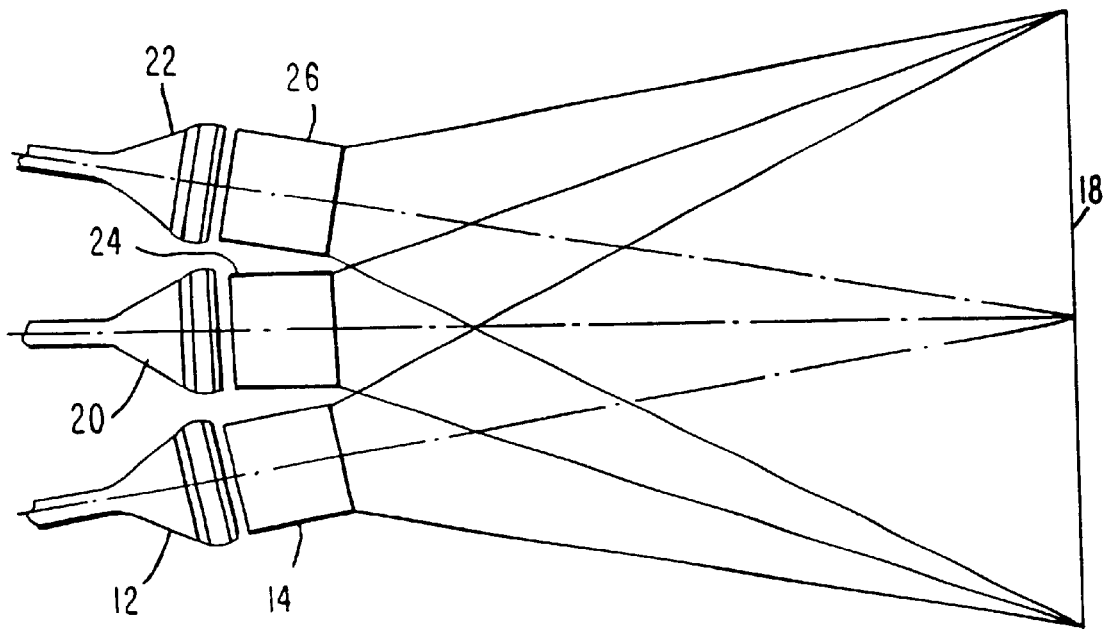
FIG. 2 illustrates the relationship between the three CRTs of the FIG. 1 set.
Figure 3:
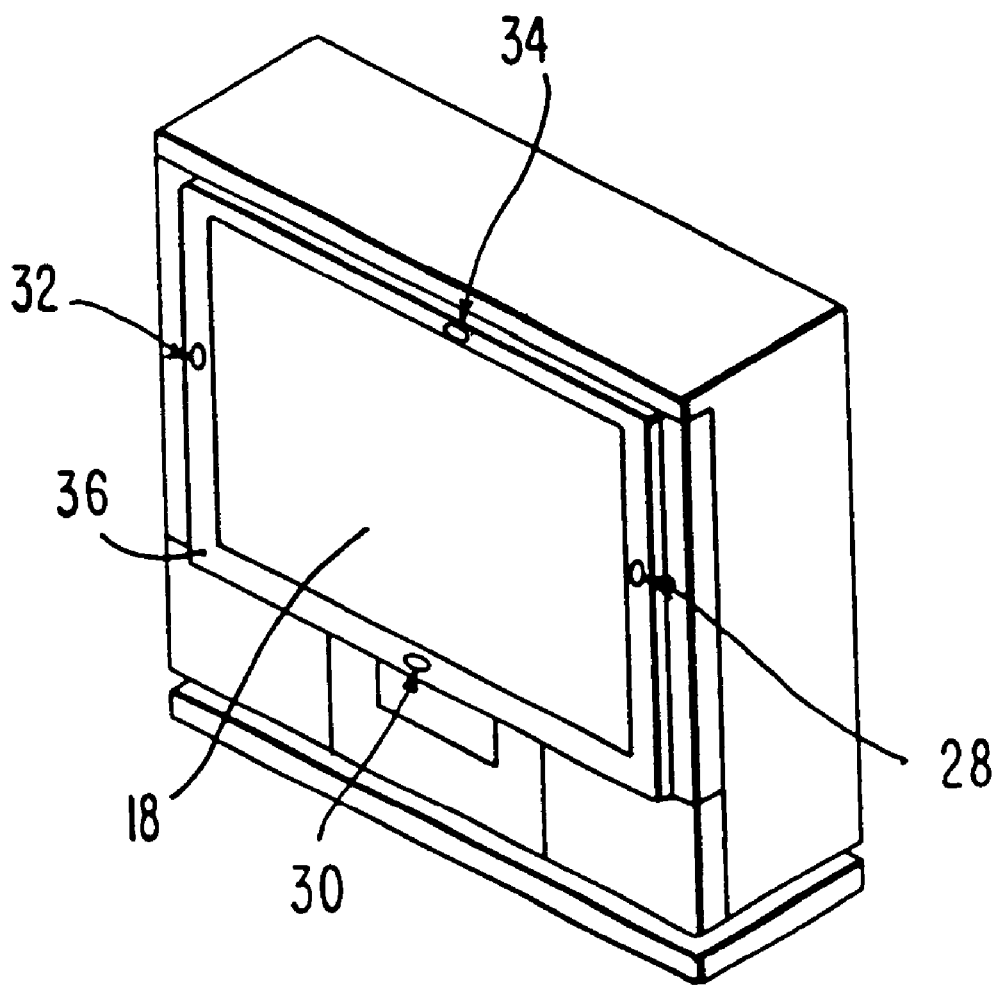
FIG. 3 shows how photosensors are typically arranged around a screen for purposes of maintaining beam convergence.
Figure 4A:
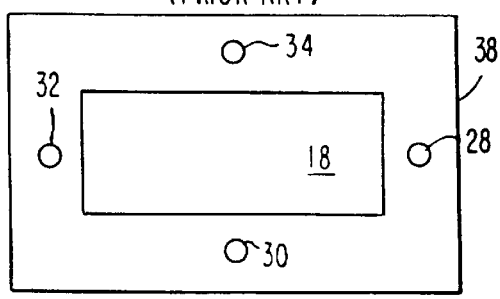
FIG. 4A shows the typical relationship between a plurality of convergence sensors, a display screen, and a CRT scannable area.
Figure 4B:
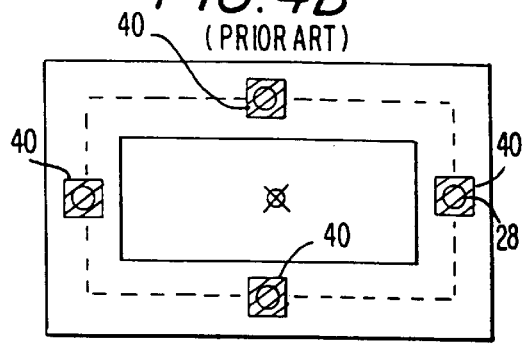
FIGS. 4B–4E show the typical relationship between the sensors, the display screen, the scannable area, and several test patterns.
Figure 4C:
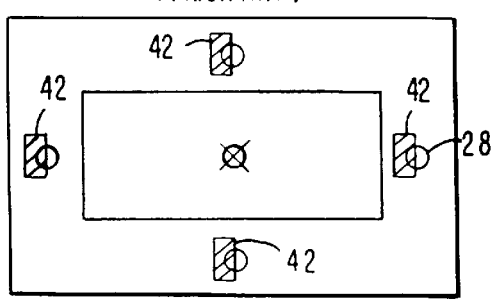
Figure 4D:
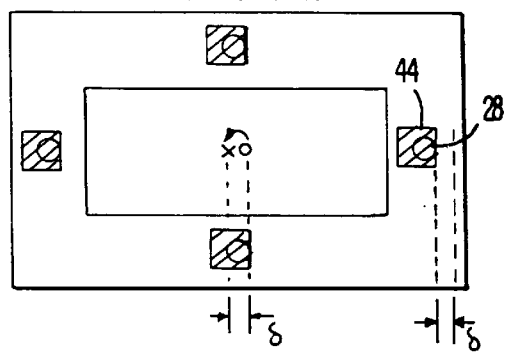
Figure 4E:
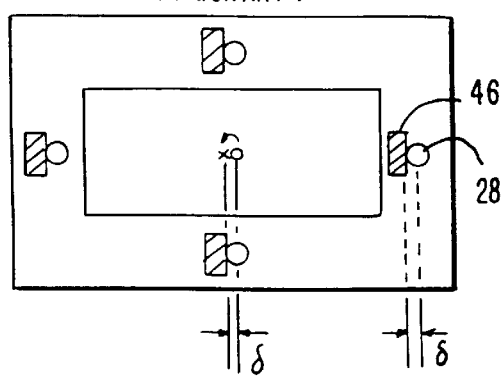
Figure 5A:
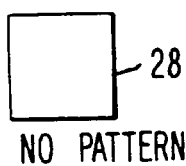
FIG. 5A is a representation of an unilluminated sensor.
Figure 5B:
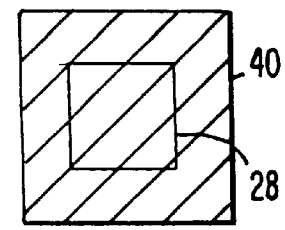
FIGS. 5B–5E are representations of the sensor of FIG. 5A as illuminated by the test patterns of FIGS. 4B–4E, respectively.
Figure 5C:
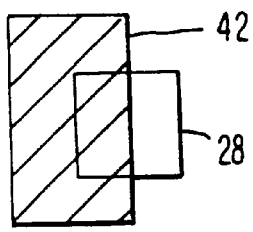
Figure 5D:
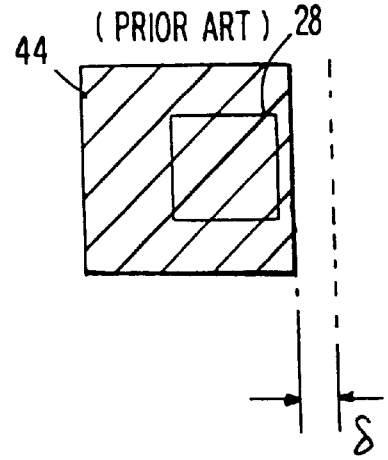
Figure 5E:
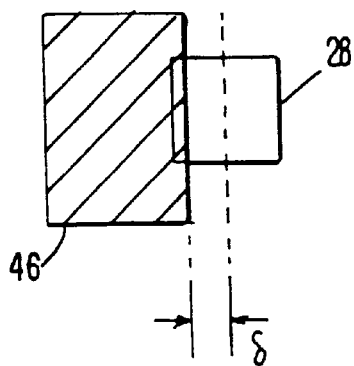

As mentioned above, A/D converters are employed to convert the output of convergence sensors from analog signals to digital signals. In prior systems, the analog sensor signals that had to be converted by the A/D converters ranged from the signal generated when the sensor was fully illuminated to the signal generated when the sensor was not illuminated at all. For example, in prior systems, the signal obtained from the unilluminated sensor in FIG. 5A and the signal from the fully illuminated sensor in FIG. 5D are both converted to digital signals so that they can be used to calculate the convergence ratio. However, in the present invention, a sensor A/D converter does not have to convert the signal from a fully illuminated sensor.

In a preferred embodiment of the present invention, the first and second test patterns are chosen such that for any given sensor the areas of the sensor overlapped by the first and second patterns are complimentary. That is, the area not overlapped by the first pattern is equal to the area overlapped by the second pattern; and the area not overlapped by the second pattern is equal to the area overlapped by the first pattern. Thus, a value for a fully illuminated sensor may be obtained by adding the digitally converted output generated during illumination by the first pattern to the digitally converted output generated during illumination by the second pattern, without actually fully illuminating the sensor. Indeed, as will be explained with references to FIGS. 7B–7E, the maximum sensor illumination is close to 50%.

Figure 7B:
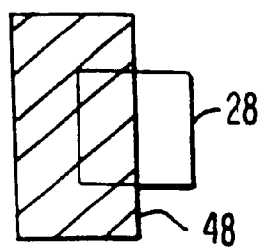
FIGS. 7B–7E are representations of the sensor of FIG. 7A as illuminated by the test patterns of FIGS. 6A–6D, respectively.
Figure 7C:
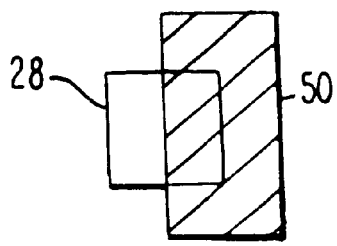
Figure 7D:
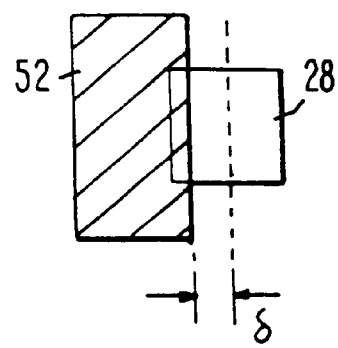
Figure 7E:
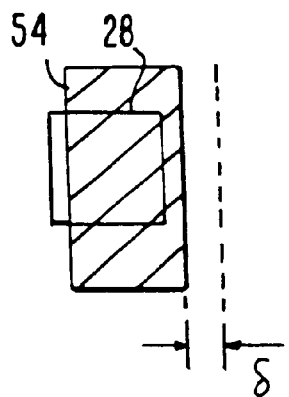

Regarding sensor illumination in the no-misalignment case, it can be seen from FIGS. 7B and 7C that the maximum signal that must be converted in the no-misalignment case is the signal corresponding to approximately 50% illumination. Regarding sensor illumination in the δ-misalignment case, it can be seen from FIG. 7E that the maximum signal that must be converted is somewhat more than the signal corresponding to approximately 50% illumination. However, the amount of misalignment δ is typically small compared to the size of the sensor, and therefore the magnitude of the signal will not be significantly larger than the signal corresponding to 50% sensor illumination. Thus, the reduction in A/D dynamic range requirement provided by the present invention is on the order of 50%.

Figure 8:
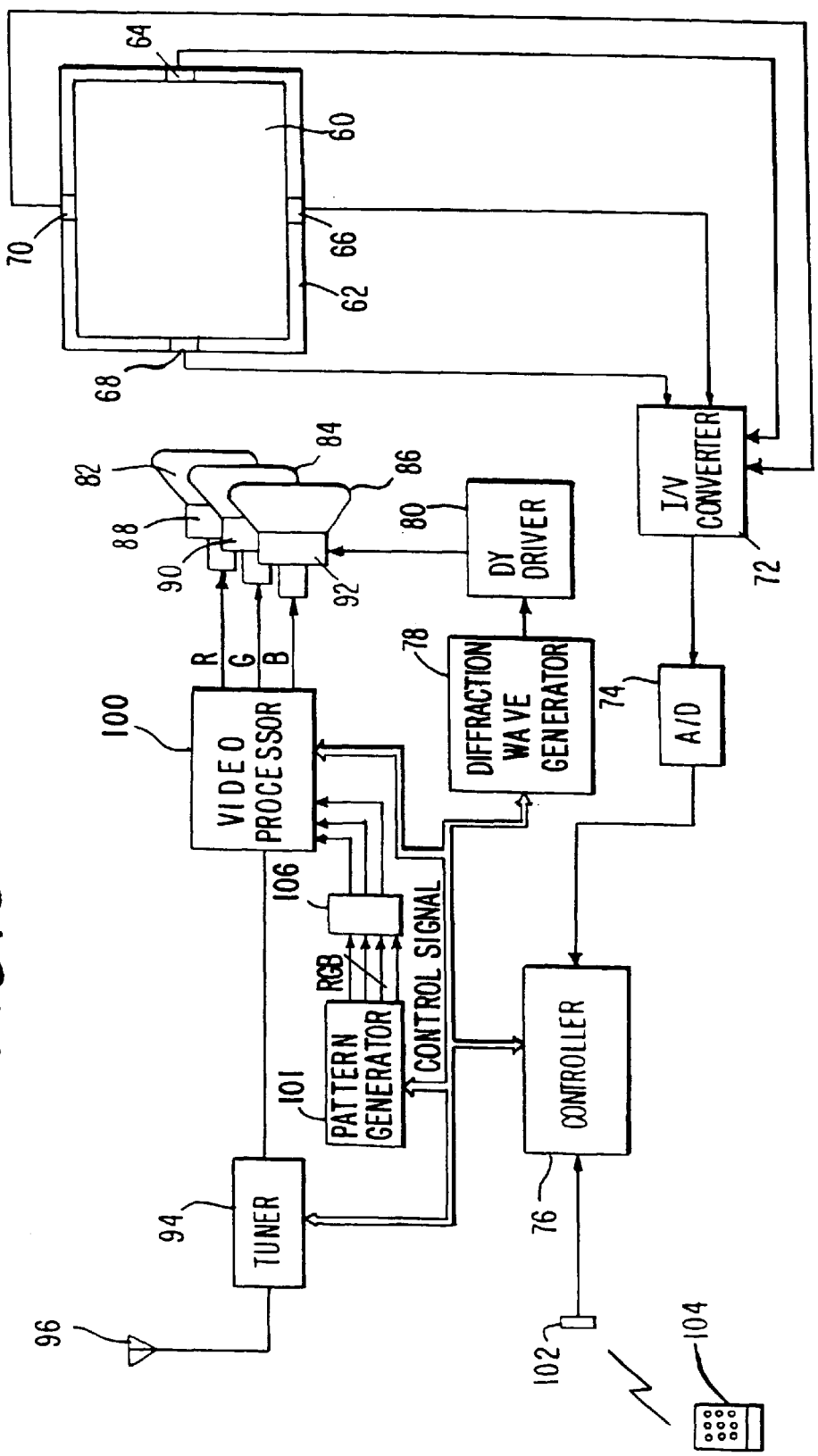
FIG. 8 is a schematic diagram of a television system according to the present invention.

A schematic diagram of a television system according to the invention is shown in FIG. 8. The system includes a television screen 60 and three CRTs 82, 84 and 86 for forming images on the screen. Each CRT emits a beam of monochromatic light in one of the primary colors (red, blue and green), and each includes a deflection yoke, 88, 90 and 92, respectively. Control of the CRTs 82, 84, 86 for the purpose of forming images on the screen is performed by a video processor 100. Connected to the video processor 100 is a pattern generator 101 via a level controller 106. The pattern generator 101 generates R, G, B signals that define either convergence test patterns during the internal convergence adjustment/calibration procedure or non-test patterns (pictures) for display on the screen 60. The level controller 106 controls the levels of the signals which are output by the pattern generator 101, as explained in detail hereinbelow. Convergence adjustment of the CRTs 82, 84, 86 is performed through a deflection yoke driver 80. Since the invention concerns convergence operations, the convergence portion of the system will be emphasized.

The system includes four convergence photosensors 64, 66, 68 and 70. These sensors are located at the periphery of the screen, behind a screen frame 62. During convergence operations, the sensors 64, 66, 68, 70 generate analog current signals which are passed to a current-to-voltage (I/V) converter 72. The current-to-voltage converter 72 converts the current signals to analog voltage signals and relays the voltage signals to an A/D converter 74. The A/D converter 74 receives the analog voltage signals, converts them to digital voltage signals, and passes the digital voltage signals to a programmable controller 76. The controller 76 then uses the digital voltage signals to perform the convergence calculations and determine the amount of any necessary beam alignment corrections. If correction is required, the controller 76 sends appropriate correction signals to a diffraction wave generator 78. The correction signals received by the diffraction wave generator 78 are converted into driver signals which are, in turn, passed to the deflection yoke driver 80. The deflection yoke driver 80 then generates one or more deflection yoke control signals and applies them to the CRT deflection yokes 88, 90 and 92. Through repeated beam adjustment by way of the deflection yokes 88, 90 and 92, proper beam alignment is maintained.

In addition to the above-identified elements, the television system of FIG. 8 includes an antenna 96, a tuner 94 and an infrared receiver 102. The tuner 94 receives television signals, such as broadcast signals, through the antenna 96 that are coupled to the video processor 100. Infrared receiver 102 is provided to allow for remote control of the system via remote control unit 104.

In a television system using the inventive calibration/adjustment circuits as described hereinabove and shown in FIG. 8, it is important to set the analog signal (voltage) at a proper level supplied to the A/D converter 74. That is, if the input signal level from the current-to-voltage converter 72 is too high, the A/D converter 74 will become saturated and, among other things, the operation of the calibration/adjustment procedure will be erroneous because the positions of the beams will not be calculated accurately. On the other hand, if the input signal level from the current-to-voltage converter 72 is too low, the conversion by the A/D converter 74 also will be imprecise. Namely, because of the low input signal level which may be additionally influenced by a noise signal level, the resolution of the A/D converter 74 will be so low that the conversion accuracy will be significantly affected. For this reason, the signal output by the current-to-voltage converter 72 should be kept at an optimum level, and preferably just below the maximum (saturation) level of the A/D converter 74.

Figure 9A:
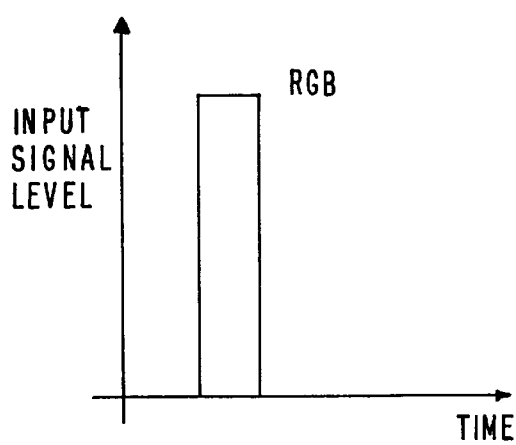
FIGS. 9A and 9B are graphs of output signals from the R, G, B sensors versus time in response to constant levels of three beams of light as emitted by the R, G, B CRTs, respectively.
Figure 9B:
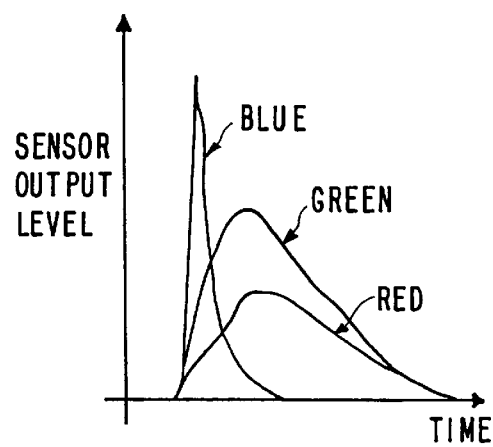
Figure 10:
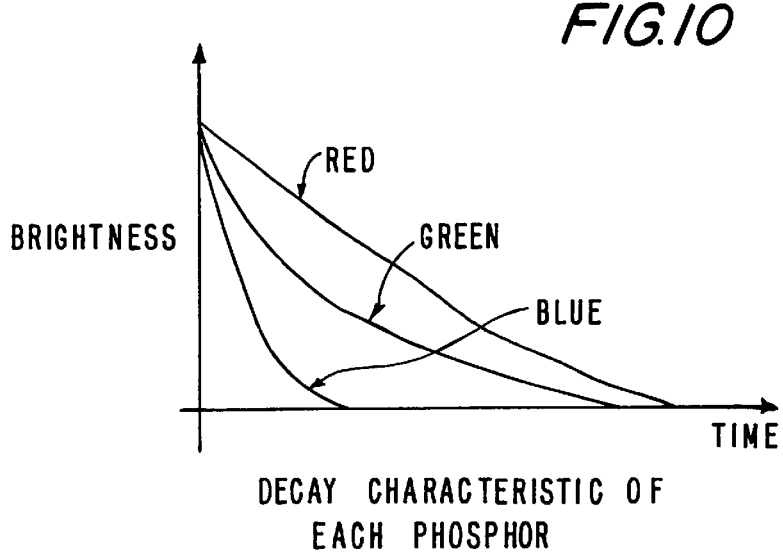
FIG. 10 is a graph of decay characteristics of phosphor responsive to primary R, G, B colors versus time.
Figure 11:
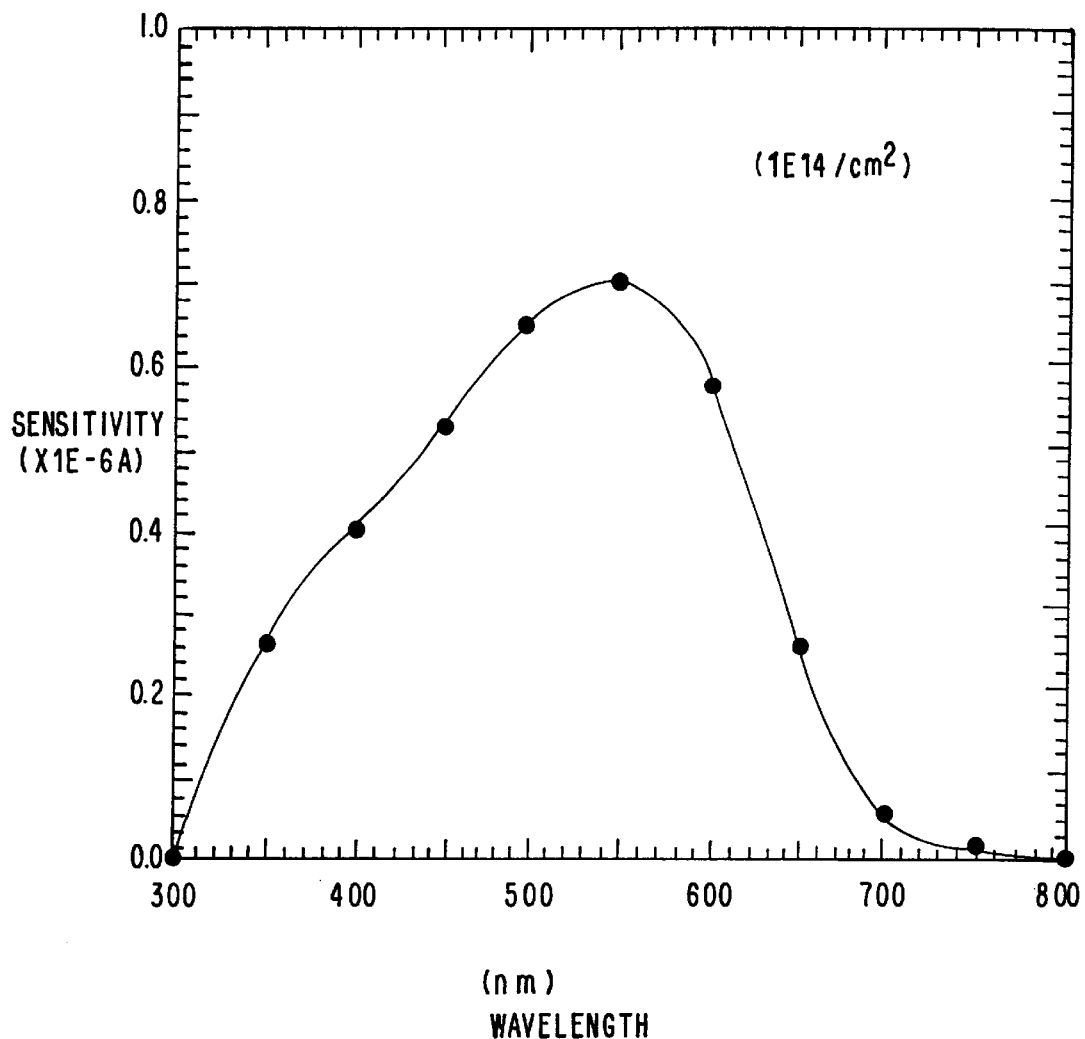
FIG. 11 is a graph of sensor sensitivity versus light beam wavelength as received by a sensor.

It has been recognized that output signal levels of red, green and blue sensors, such as the convergence photosensors 64, 66, 68 and 70, vary even if an input signal level is constant or substantially the same. As shown in FIG. 9A, when the input signal to the photosensors is maintained at substantially the same level to generate the red, green and blue light beams by the CRTs 82, 84 and 86, respectively, the R, G, B sensors (such as the convergence photosensors 64, 66, 68 and 70) produce different output signal levels based on primary colors, as shown in FIG. 9B. Namely, FIG. 9B shows that the highest signal output is produced by the photosensors responding to a blue light beam, followed by the photosensors responding to a green light beam and finally a red light beam. This difference in output signal levels is due to variations in decay characteristics of each phosphor corresponding to the R, G, B primary colors as shown in FIG. 10. Further, FIG. 11 illustrates a relationship between sensitivity of a photosensor and a light beam having various wavelengths to which the photosensor responds, thereby indicating another reason for the variations in the output signal levels of the sensors.

To compensate for the variations in output signal levels of the R, G, B sensors as indicated hereinabove, it has been suggested to use the video processor 100. That is, under control of program instructions, either from external or internal memory, the video processor 100 adjusts the R, G, B signal levels accordingly.

Several disadvantages, however, accompany the above-mentioned type of signal level control. For instance, different types of video processors may be used in video systems requiring specific programs (software) to be individually created for each type of video processor. In addition to sacrificing uniformity in software, a long response time negatively affects processing speed in the video system as the video processor executes time-intensive software routines for each of the R, G, B sensors.

Figure 12:
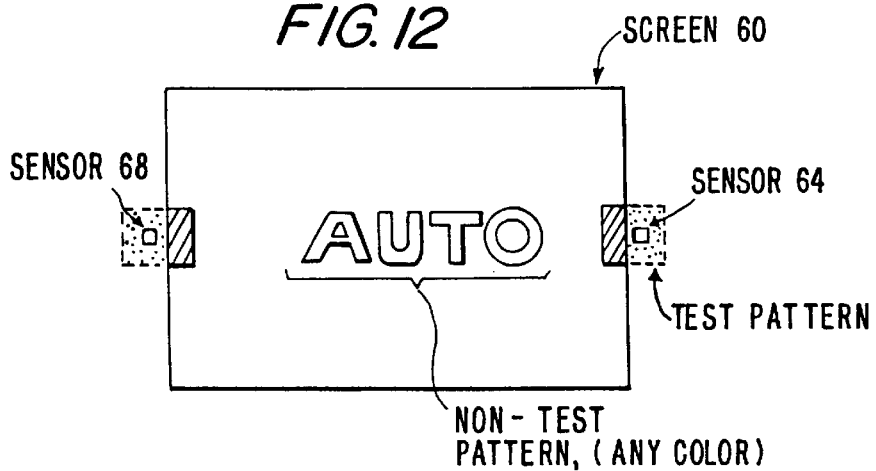
FIG. 12 shows a block diagram of the television screen displaying a picture (a so-called non-test pattern) simultaneously with the convergence test pattern directed at the sensors located just outside the left and right edges of the television screen.

A further disadvantage is that the above-mentioned software controlled level adjustment may change the entire display on a screen. As shown in FIG. 12, a picture (a so-called non-test pattern) as representatively shown by the display "AUTO" may be displayed on the television screen 60 at the same time as the convergence test pattern is directed at the sensors, as representatively shown being located just outside the left and right edges of the television screen 60. In this situation, brightness of the display "AUTO" is undesirably changed in accordance with specific program instructions directed to a particular color in the test pattern. Since the video processor does not distinguish between the test and non-test patterns and controls the signal level based only on the R, G, or B color, the picture display is affected.

Figure 13A:
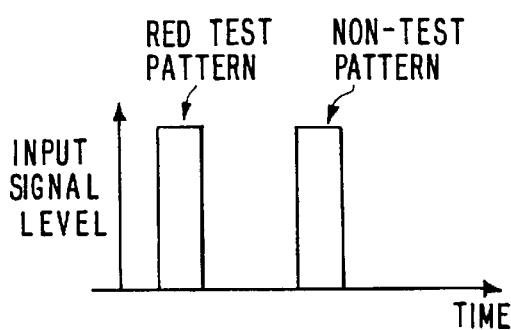
FIGS. 13A and 13B are graphs of signal levels provided by the video processor during test and non-test patterns.
Figure 13C:
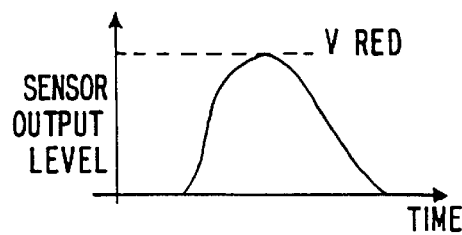
FIGS. 13C and 13D are graphs of signals output by the sensors in correspondence with the signals provided by the video processor as illustrated in FIGS. 13A and 13B.
Figure 13B:
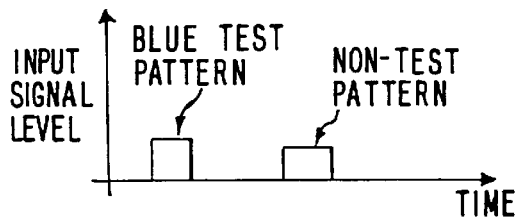
Figure 13D:
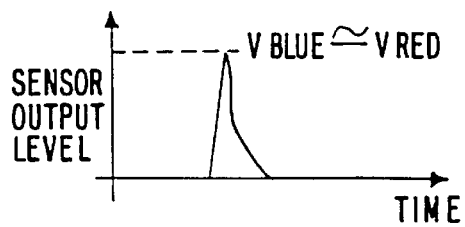

FIGS. 13A and 13B show the input signal level maintained by the video processor 100 at substantially the same level for test and non-test patterns alike (representatively shown for red and blue light beams as generated by the CRTs 82 and 86, respectively). The corresponding red and blue sensors, such as the convergence photosensors 64, 66, 68 and 70, produce the same output signal levels for test and non-test patterns, as shown in FIGS. 13C and 13D. Thus, the software-controlled signal level adjustment by the video processor 100 is disadvantageous for the reasons as stated hereinabove.

To overcome the above disadvantages associated with the software-controlled signal level adjustment due to the variations in output signal level of the sensors, in accordance with one aspect of the present invention, the level controller 106 is provided in the television system of FIG. 8. During the calibration procedure, the level controller 106 receives R, G, B signals for forming test or non-test (picture) patterns and a control signal from the pattern generator 101, controls the respective level of the received R, G, B signals accordingly, and outputs them to the video processor 100 for further processing as previously explained.

Figure 14:
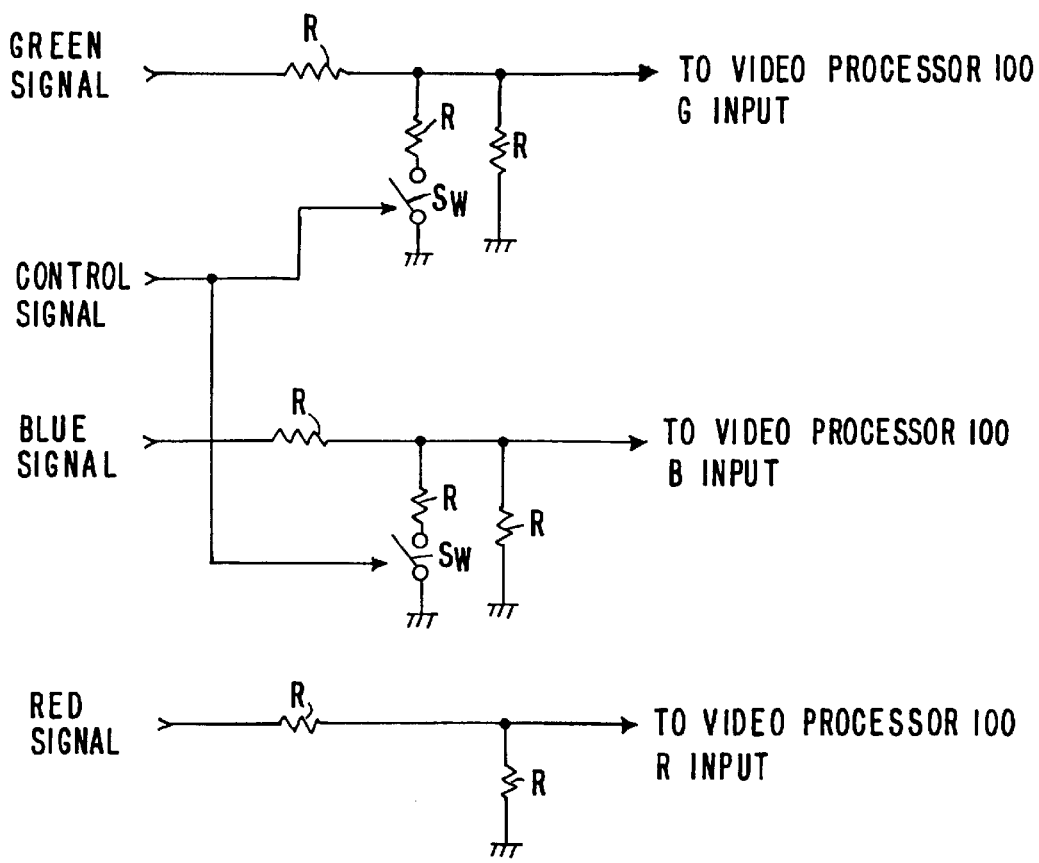
FIG. 14 shows a representative embodiment of a level controller in accordance with one aspect of the present invention.

One representative embodiment of the level controller 106 is shown in FIG. 14. The level controller 106 can be built inexpensively by using switches and resistors having appropriate values to obtain a predetermined signal level corresponding to each primary color R, G, B such that A/D converters (such as the A/D converter 74) are provided with optimum signal level, that is neither saturated nor supplied with a very low input level. As further shown in FIG. 14, the switches are controlled by the control signal supplied from the pattern generator 101 (FIG. 8). In response to the control signal, the switches may be in the closed (on) position or open (off) position.

In operation, during the convergence calibration/adjustment operations as described hereinabove in accordance with the present invention, R, G, B signals defining a preselected test pattern for calibration are generated by the pattern generator 101 as shown in FIG. 8, and the R, G, B signals are supplied to the level controller 106. In addition, the pattern generator 101 activates the control signal supplied to the level controller 106. In response to the control signal, the level controller 106 adjusts the R, G, B signals to an optimum level. In particular, the switches in the level controller 106 are closed (turned ON) by the control signal, whereby the respective levels of the R, G, B signals are changed (attenuated) based on a predetermined resistor selection, for example, as representatively shown in FIG. 14. Following the processing by the level controller 106, the R, G, B signals are output to the video processor 100.

When the convergence calibration/adjustment procedure is not performed, that is, during the picture display on the screen 60, the pattern generator 101 de-activates the control signal supplied to the level controller 106. As a result, the level controller 106 merely passes the R, G, B signals through without modification. The switches in the level controller 106 become open (turned OFF), whereby the respective level of each R, G, B signal is passed through to the video processor 100 as shown in FIG. 14.

FIGS. 15A–E are graphs of various input and output signals provided by the pattern generator 101, level controller 106, video processor 100 and sensors 64, 66, 68, 70 in accordance with the present invention as described hereinabove. As representatively shown in FIG. 15A, the pattern generator 101 generates signals having predetermined levels and defining B, G test patterns and a non-test (picture) pattern. FIG. 15B shows the control signal as supplied to the level controller 106 by the pattern generator 101. The control signal is activated only during the convergence calibration operation, as representatively shown for the blue and green test patterns. FIG. 15C shows the input signals to the video processor 100 following the processing by the level controller 106. The levels of B and G signals defining the corresponding test pattern are attenuated to attain proper level, while the signal defining the non-test pattern (picture) remains at the same level as prior to the processing by the level controller 106. FIGS. 15D and 15E are graphs of signals produced by the representative left and right sensors corresponding to the B and G signals as supplied by the video processor 100 to the respective CRTs. The signals output by the sensors are at such levels as to obtain maximum resolution in the A/D converters in the video system.

In accordance with the present invention, the signal levels are controlled in a simple, efficient and cost effective manner. Neither additional and time-consuming software for the video processor nor complicated hardware is required to attain proper level control of the video signals.

It is understood that other embodiments will be readily apparent to those skilled in the art based on the teaching herein. For example, for one or more sensors used in a convergence procedure, the area overlapped by the first test pattern when added to the area overlapped by the second test pattern does not need to be equal to the entire photosensitive area (surface) of the sensor(s), but rather may be equal to some other predetermined area.

Figure 16:
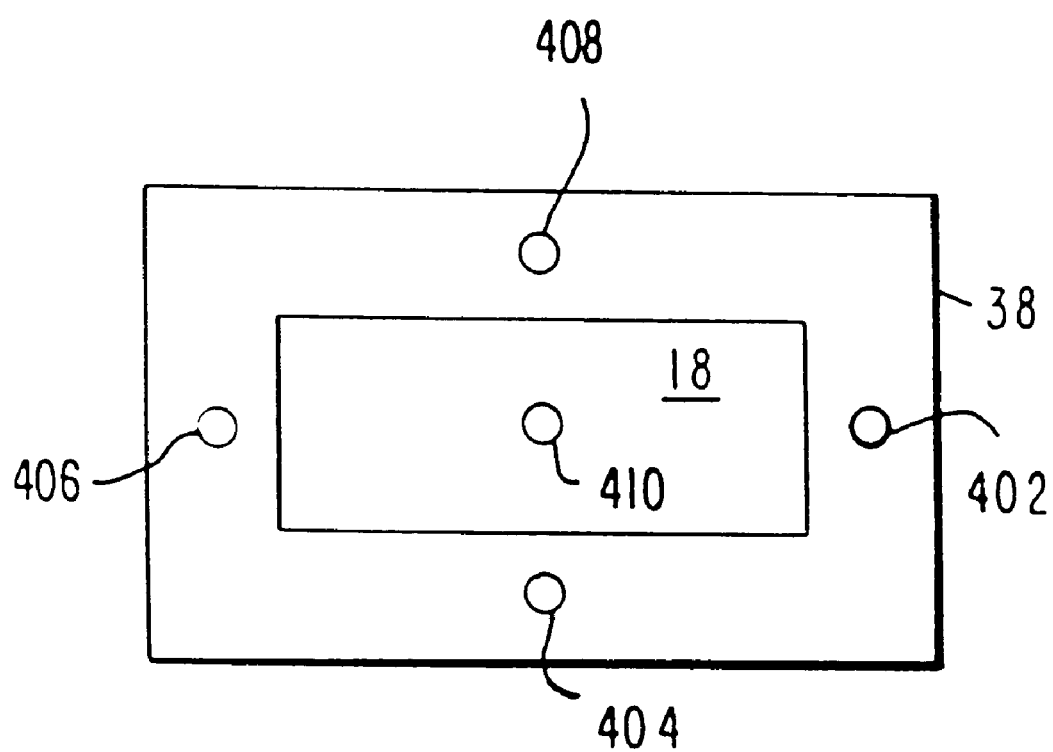
FIG. 16 shows the relationship between sensors, display screen, and scannable area for an alternative sensor arrangement in accordance with the present invention.

Moreover, sensor arrangements other than those described above may be employed. For example, sensors may be arranged as shown in FIG. 16. In the FIG. 16 configuration, five sensors are employed, 402–410, sensor 410 being located at the center of the screen. Convergence testing is conducted in the same manner as described above with the exception that the test patterns include five illuminated areas.

Furthermore, the invention is applicable to many types of video displays and is not limited to rear projection television sets. For example, the invention may be employed in computer system monitors.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A system for performing a convergence calibration operation using at least one beam, comprising:

a level controller for selectively controlling a level of an input video signal only when said input video signal includes a test pattern signal;

a beam generator for generating a beam pattern in response to said input video signal supplied by said level controller;

at least one sensor for converting the generated beam pattern to an output signal; and a programmable controller for receiving said output signal and for determining alignment of said at least one beam based on the received output signal.

2. A method for performing a convergence calibration operation using at least one beam, comprising the steps of:

selectively controlling a level of an input video signal only when said input video signal includes a test pattern signal;

generating a beam pattern in response to said input video signal;

converting the generated beam pattern to an output signal;

receiving said output signal; and determining alignment of said at least one beam based on the received output signal.

3. Apparatus for performing a convergence calibration operation using a number of beams, comprising:

a signal generator for generating first and second video signals for use in said convergence calibration operation;

a level controller for selectively controlling respective levels of the generated first and second video signals received from said signal generator only when said respective first and second video signals include a test pattern signal;

a beam generator for generating first and second beam patterns in response to said first and second video signals, respectively, supplied by said level controller;

at least one sensor for converting the generated first and second beam patterns to first and second output signals, respectively, in response to the generated first and second beam patterns, respectively; and a programmable controller for receiving said first and second output signals and for determining alignment of the beams based on the received first and second output signals.

4. Apparatus for performing a convergence calibration operation using a number of beams, comprising:

a signal generator for generating first and second video signals for use in said convergence calibration operation;

a level controller for controlling respective levels of the generated first and second video signals received from said signal generator;

a beam generator for generating first and second beam patterns in response to said first and second video signals, respectively, supplied by said level controller;

at least one sensor for converting the generated first and second beam patterns to first and second output signals, respectively, in response to the generated first and second beam patterns, respectively; and a programmable controller for receiving said first and second output signals and for determining alignment of the beams based on the received first and second output signals, wherein said signal generator selectively generates a control signal such that said level controller controls said respective levels of the generated first and second video signals in response to said control signal received from said signal generator.

5. The apparatus according to claim 4, wherein said control signal is active only during said convergence calibration operation.

6. The apparatus according to claim 4, wherein said level controller comprises a number of switches and resistors for selectively attenuating said respective levels of the generated first and second video signals.

7. The apparatus according to claim 6, wherein said signal generator generates said control signal to close the switches only during said convergence calibration operation.

8. The apparatus according to claim 3, wherein said at least one sensor has at least first and second portions of a sensitive surface exposed to the beams such that said first and second beam patterns generated by said beam generator overlap said first and second portions, respectively.

9. The apparatus according to claim 8, wherein said first and second portions comprise the entire sensitive surface of said at least one sensor.

* * * * *